Sept. 29, 1953         J. L. RUPP         2,653,988
STORAGE BATTERY AND MOUNTING AND CONNECTION MEANS THEREFOR
Filed Nov. 12, 1949         2 Sheets-Sheet 1
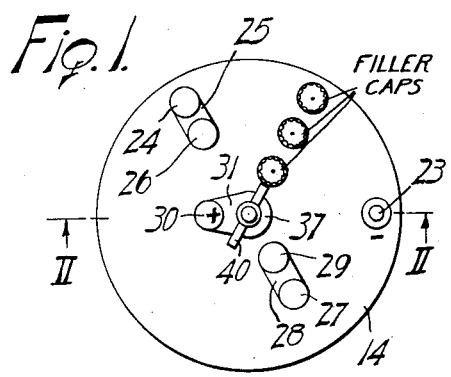
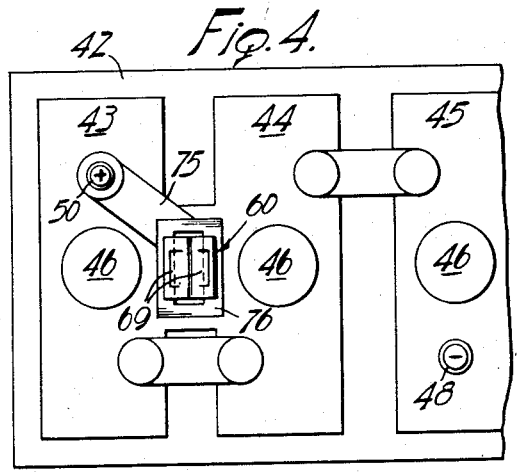
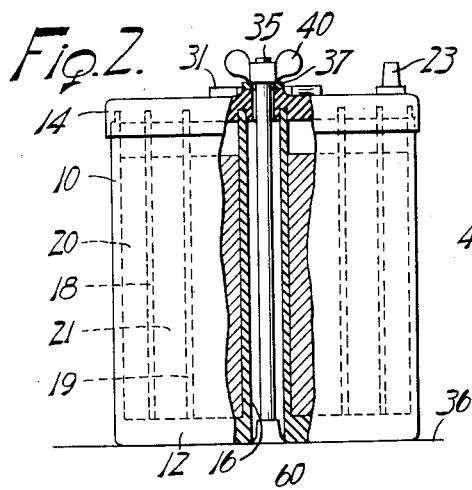
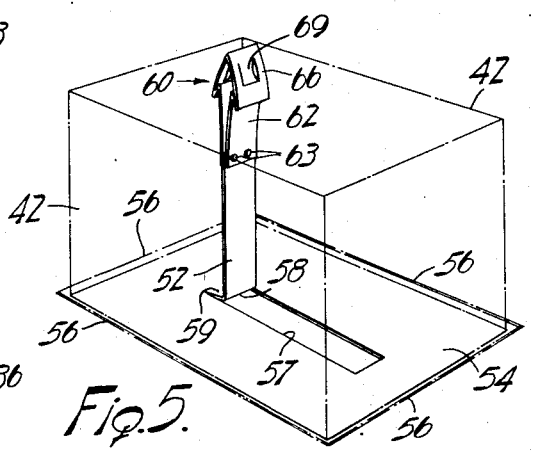
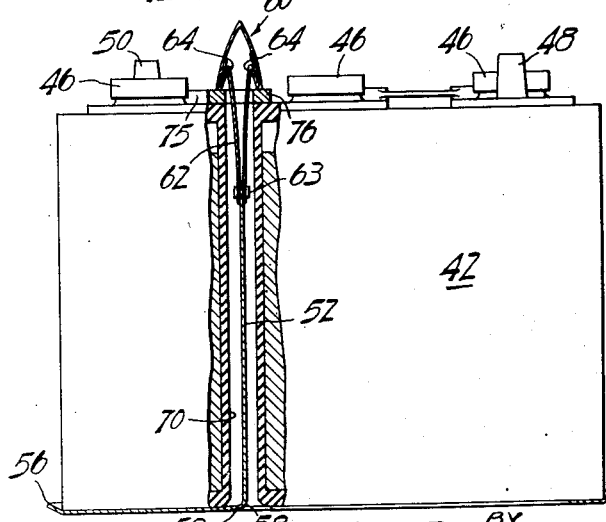
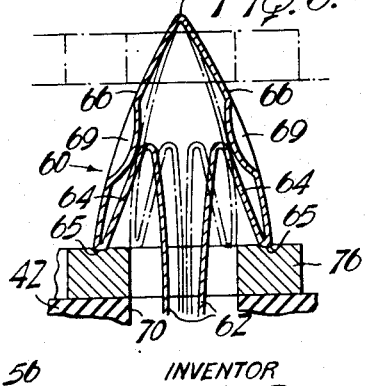
INVENTOR
John L. Rupp
BY Bean, Brooks, Buckley & Bean
ATTORNEYS Patented Sept. 29, 1953

2,653,988

UNITED STATES PATENT OFFICE 2,653,988

STORAGE BATTERY AND MOUNTING AND CONNECTION MEANS THEREFOR

John L. Rupp, Williamsville, N. Y., assignor to National Battery Company, St. Paul, Minn.

Application November 12, 1949, Serial No. 126,901

8 Claims. (Cl. 136—181)

This invention relates to storage batteries, and more particularly to storage batteries of the automotive vehicle type and to means for mounting such batteries in vehicles and the like. This application is a continuation in part of my copending patent application Serial No. 559,002, filed Oct. 17, 1944, which application matured into Letters Patent No. 2,487,831, dated November 15, 1949.

One of the objects of the invention is to provide an improved type storage battery and improved type mounting means whereby such a battery may be detachably fixed in mounted position upon an automotive vehicle or the like in improved manner.

Another object of the invention is to provide in an automotive vehicle or the like improved means for mounting a storage battery therein.

Still another object of the invention is to provide an improved storage battery arrangement for automotive vehicles and the like.

Still another object of the invention is to provide improved means for effecting the "ground" connection between one of the storage battery terminals and the frame of the vehicle upon which the battery is mounted.

Other objects and advantages of the invention will appear from the specification hereinafter.

In the drawing:

Fig. 1 is a top plan view of a storage battery embodying one form of mounting and "ground" connection means of the invention;

Fig. 2 is a view partly in side elevation and partly in vertical section taken along line II—II of Fig. 1;

Fig. 3 is a side elevation of another form of the battery of the invention, with portions broken away to show in section the battery mounting means thereof;

Fig. 4 is a fragmentary top plan view of the battery and mounting means of Fig. 3;

Fig. 5 is a perspective view of the battery mounting means of Figs. 3–4;

Fig. 6 is an enlarged fragmentary sectional view of a detail of Fig. 3, showing the battery holding device in operative and inoperative positions;

Figure 7:
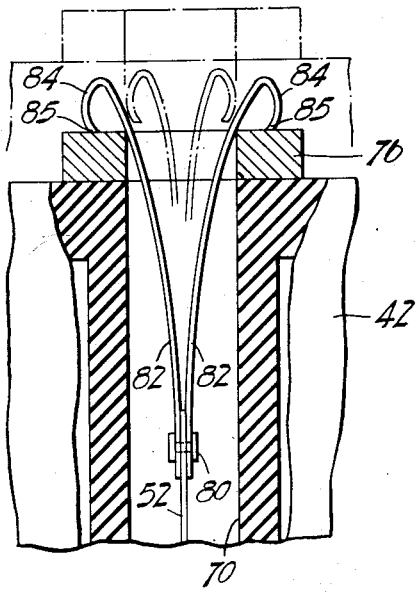
Fig. 7 is a fragmentary sectional view of another form of holding device of the invention.

In Figs. 1–2 of the drawings, the invention is illustrated in conjunction with a storage battery comprising an outer case of cylindrical form designated 10 having an integral annularly shaped bottom portion 12 and a similarly shaped cover member 14. The casing structure also includes a central tubular wall 16 extending vertically therethrough. Thus, the casing structure is of annular form, and as indicated at 18—19 may be intermediately partitioned by circular wall portions disposed concentrically of the inner wall 16 so as to divide the interior of the battery case into three separate and concentric compartments which are designated 20—21—22 respectively. It will of course be understood that the casing and partition elements may be arranged to provide any desired number of cells and may be molded of any suitable acid-resistant material such as hard rubber or glass or the like; and that the battery case and bottom and wall portions may be integrally formed from a suitable thermoplastic material by a simple molding process.

Thus, the battery case as illustrated provides in a single compact unit a group of concentric battery cells each of which are separate and annular in horizontal section, and are therefore adapted to receive in helically coiled relation therein adjacently disposed positive plate and separator and negative plate elements so that each cell of the battery contains alternately disposed positive and negative plate elements with suitable separator devices therebetween.

The negative plate of the outer cell 20 is electrically connected to a terminal post 23, and suitable leads (not shown) from the positive plate of the outer cell 20 are electrically connected to a terminal 24 which in turn is electrically connected through a bus bar 25 to a terminal 26 which is arranged in electrical connection with the negative plate of the center cell 21. The positive plate of the center cell 21 is arranged in electrical connection with a terminal 27 which in turn connect through a bus bar 28 to a terminal 29 which is in electrical connection with the negative plate of the inner cell 22. The positive plate portion of the inner cell 22 is arranged in electrical connection with a terminal 30 which is in turn connected to a conductor plate 31 which leads over to the center of the battery and is centrally apertured in alignment with the central opening through the tube structure 16 of the battery case. Thus, the post 23 constitutes the negative terminal of the battery and the post 30 constitutes the positive terminal, but it will be appreciated that the polarities of the posts may be reversed by reversing the connections referred to, if preferred.

It is a particular feature of the invention that this battery arrangement permits the "grounded" terminal to be provided in the form of a metal strap 31 which extends from the inner cell to the nearby position of the central opening through the battery case, whereby the "ground" strap may be of short length and yet will provide a suitable electrical connection with a metal post or draw bar as indicated at 35 which extends uprightly from base structure 36 upon which the battery is set when mounted in the vehicle to be served. Thus, as shown in the drawing, the strap 31 preferably terminates in a flat eye portion 37 which overlies the central aperture through the battery case cover member 14, and a wing nut or the like as indicated at 40 may be provided to thread down upon the holding rod 35 so as to simultaneously lock the battery structure in firmly mounted relation upon the base member 36 and to effect electrical connection between the terminal strap 31 and the rod 35. It will of course be understood that the rod 35 will also be arranged at its lower end in firm electrical connection with the frame structure of the vehicle mounting the battery, whereby a firm physical support of the battery is obtained in combination with an efficient electrical "ground" connection to the frame of the vehicle is obtained.

Figs. 3–6 illustrate another form of battery and battery mount arrangement of the invention, wherein the battery is illustrated to be generally in the well known rectangular case form. As shown herein, the battery comprises a case 42 having therein three separate cells as shown by their corresponding cover plate elements 43—44—45. Thus, the drawing depicts a three-cell type storage battery such as is customarily used for starting and lighting service in present day automobiles and the like; but it will of course be understood that the invention may be applied with equal facility to storage battery devices of any number of cells. In the drawing each cell is illustrated to be provided with a filler cap 46 and an upstanding negative connection terminal post 48 is illustrated as extending above one of the end cells of the battery for detachable connection with the usual flexible cable as is customary in automotive battery practice. Similarly, the positive terminal device of the battery is illustrated to extend through the cover structure as indicated at 50 (Fig. 4) and may of course be formed thereat with an upstanding terminal post structure to receive the customary "ground" cable as is conventional in automotive battery practice. However, in accord with the present invention a novel form of "ground" connection may be effected in conjunction with the battery hold-down mechanism, as will be explained hereinafter.

The battery hold-down arrangement of the invention is illustrated in Figs. 3–6 to comprise an upstanding rod or strap 52 which is either formed integrally with or firmly connected at its bottom end to the base plate structure 54 upon which the battery rests when in mounted position. Preferably, the base plate 54 will be provided in the form of a generally flat metal plate member having upturned rims 56 at the edges thereof for automatically centering the battery in position upon the base plate and retaining it thereon against sidewise displacement. As shown in Figs. 3 and 5, the strap member 52 may be formed integrally with the base plate 54 by cutting the base plate as indicated at 57 to provide the member in the form of a tongue connected at one end thereof to the base plate. Preferably the tongue member 52 will be upwardly bent as indicated at 58 (Fig. 3) at a position spaced from the anchored end portion of the tongue, whereby a generally horizontally disposed "spring" portion 59 interconnects the bottom plate structure 54 and the upright tongue portion 52. The parts are preferably formed of springy steel or the like, whereby it will be appreciated that the tongue member 52 is thereby adapted to be pulled upwardly against the spring action of the portion 59, for purposes to be explained hereinafter.

The strap member 52 is fitted at its upper end with a spring hook device which as shown in Figs. 3–6 may comprise a strip of spring metal which has been bent to provide oppositely paired leg portions 62—62 permanently fixed at their lower ends to the upper ends of the strap 52 as by means of rivets indicated 63. At their upper ends the leg portions 62—62 lead into reverse bent arm portions 64—64 (Fig. 6) which terminate in downwardly directed ridge portions 65—65 and then lead into upwardly bent pressure pad portions 66—66 which unite in integral connection at the apex portion 68 of the device. Preferably, the portions 66—66 are deformed as indicated at 69 to facilitate finger gripping thereof. Thus, it will be appreciated that the spring hook member may be readily formed from a single strip of spring metal by bending it into the sectional form thereof shown in Fig. 6 and then riveting the paired lower ends thereof to the tension strap 52 as indicated at 63.

As illustrated in Fig. 3, the cell partition wall structure of the battery case is vertically apertured as indicated at 70 so as to register with the tension strap and spring hook device whenever the battery is lowered into resting position upon the base plate 54; and the vertical aperture 70 and the spring hook device 60 are so constructed and arranged that the aperture 70 is of lesser width than the width between the bottom ledge portions 65—65 of the spring hook device when the latter is in its normal open position, as illustrated by the solid line showing thereof in Fig. 6. However, as shown in the figures, the spring hook device is so constructed and arranged that the resiliency of the various portions thereof operate normally to cause the hook device to assume the "open" condition thereof shown in the drawing, but upon application of squeezing pressures against the side pad portions 66—66 the hook device may be compressed against the elastic forces of the material thereof, such as to the broken line position thereof shown in Fig. 6 whereupon the hook device is contracted to such width dimension as to enable it to slip-fit through the aperture 70 in the battery case partition member.

Thus, it will be appreciated that the battery of the invention may be mounted upon the device shown in the drawing by simply first inserting the apex portion of the hook device 60 into the lower end of the aperture 70, and then lowering the battery into resting position upon the base plate 54. At this stage the upper end of the hook device 60 will protrude above the top cover of the battery and may thereupon be grasped between the fingers of the operator and pulled upwardly upon so as to draw the tension strap 52 upwardly against the spring force of the "spring" portion 59 at the bottom end of the strap, until the bottom ledge portions 65—65 of the spring hook device 60 clear the upper face of the cover structure of the battery in the region of the aperture 70. The spring forces within the hook device 60 will thereupon operate to cause the latter to expand as to the solid line condition thereof shown in Fig. 6, whereupon the bottom ledge portions 65—65 of the hook device will firmly engage upon the top cover structure of the battery so as to apply a constant pull-down force against the battery for maintaining it firmly in mounted position upon the base plate 54.

As in the case of the battery terminal arrangement of Figs. 1-2, the mounting mechanism of the arrangement of Figs. 3-6 provides also for a novel and improved "ground" connection arrangement because a conductor strap 75 (Fig. 4) may be conveniently arranged to extend as from the terminal 50 over into the region of the battery case mounting aperture and to terminate thereat in an eye portion 76 formed to encircle the upper end of the aperture 70 through the battery case partition wall and to receive the bottom ledge portions 65—65 of the spring hook device (Fig. 6) in firmly gripped relation when the battery is mounted as explained hereinabove. Thus, an efficient "ground" connection is provided through the strap member 75 and the hook device 60 into the tension member 52 which is formed integrally with the bottom plate 54, whereby it will be appreciated that a convenient and otherwise improved method for "grounding" the mounted battery is provided in combination with improved physical support of the battery when in mounted condition.

Fig. 7 illustrates fragmentarily a modified form of the spring hook device of the invention, and in this case the tension strap member 52 which corresponds to the similarly designated member of Figs. 3-6 connects at its upper end as by means of rivets 80 or the like to a pair of leaf spring members 82—82 which extend upwardly therefrom in diverging relation and lead into reversely bent pad portions 84—84 which terminate in bottom ledges 85—85. The spring parts are so constructed and arranged that when they are in normal extended position as illustrated by the solid line showing in Fig. 7 they reach outwardly so as to engage the ledge portions 85 thereof in firmly anchored relation upon the terminal strap 76 referred to hereinabove, so as to provide at once the firm battery mounting effect and the efficient electrical "ground" effect as explained hereinabove. To permit the battery to be removed from mounted position, the pad portions 84—84 are simply squeezed upon so as to force the spring hook device to assume a width dimension permitting it to slip-fit through the aperture 70 of the battery case. Also, as explained in connection with the arrangement of Figs. 3-6, in order to mount the battery upon the hook device of Fig. 7, the spring pad portions 84—84 are simply squeezed together so as to enable the upper ends of the spring elements to slip-fit into the lower end of the aperture through the battery case, whereupon the battery may be lowered into mounted relation upon the base plate, and whereupon the hook device will protrude above the top cover of the battery case and may then be pulled upon so as to displace the strap 52 upwardly against the spring action thereof as explained hereinabove, whereupon the hook device will clear the top cover structure of the battery and will expand into battery locking position.

Figure 8:
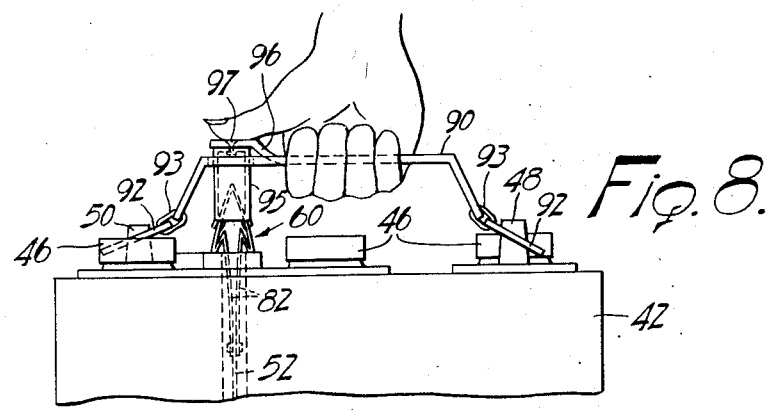
Fig. 8 is a fragmentary side elevation showing operation of a special tool for unlocking and lifting a battery from the mounting of the invention.
Figure 9:
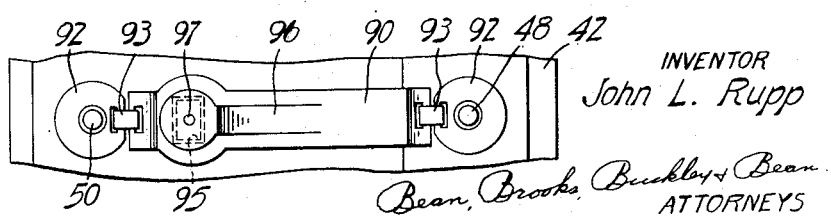
Fig. 9 is a fragmentary top plan of the tool of Fig. 8.

Figs. 8 and 9 illustrate another method and means for releasing the mounting hook device of Figs. 3-6 incidental to lifting of the battery from mounted position; there being provided a battery carrying handle 90 formed of substantially rigid metal or the like and having linked to its opposite ends a pair of battery terminal post engaging rings 92, as by means of link devices 93. The rings 92—92 are centrally apertured so as to freely slip-fit down upon the battery terminal posts 48—50 whenever the rings are disposed in horizontal attitude, but whenever they are pulled upwardly at one edge thereof so as to become "cocked" relative to the terminal posts they will thereby grip the posts so as to prevent sliding therefrom, whereby the handle device may be employed to lift the battery out of mounted position.

As shown in Figs. 8-9, the handle member 90 is formed to include a suitable cam device which may be provided in the form of an open ended box 95 fixed to a spring finger portion 96 of the handle member 90, as indicated at 97. Thus, the finger portion 96 may be pressed upon as illustrated in Fig. 8 incidental to lifting upwardly against the handle portion 90 for battery lifting purposes, whereby the cam box 95 will be thereby thrust downwardly to enclose the spring hook device 60 and to cam the opposite sides thereof toward each other so as to release the hook device from engagement against the top surface of the battery case. Thus, by means of this simple tool as illustrated in Figs. 8-9, the operator may by use of only one hand simultaneously release the hook 60 and lift upwardly against the battery so as to remove it from mounted position.

The battery mounting arrangement of the invention greatly facilitates the job of mounting and changing batteries in automotive vehicles, aircraft and the like, and greatly reduces the time required to change batteries in installations where such time savings are important. The interiorly disposed battery hold-down device centers the holding down forces near the position of the center of gravity of the battery, and in this respect it will be appreciated that whereas the drawing at Figs. 3-5 and 8 illustrate provision of only one hold-down device inside of one of the intermediate partitions of a three-cell battery, any desired number of hold-down devices of the invention may be employed in one or more of the partition portions of a battery. The preferred number and location of the hold-down devices will depend upon the plan view shape and dimensions of the battery to be mounted. In any case the relatively narrow aperture or apertures provided through the relatively rugged partition elements of the battery case enable the hold-down devices of the invention to provide firm support of the battery without danger of breakage of the battery case structure; and as explained hereinabove the novel battery hold-down and ground connection mechanism operates automatically to provide firm battery support and efficient "grounding" of the battery without special attention by the operator to the grounding connection.

It will of course be appreciated that although only a few forms of the invention have been shown and described in detail herein, it will be apparent to those skilled in the art that the invention is not so limited but that various changes may be made therein without departing from the spirit of the invention or the scope of the appended claims.

I claim:

1. In combination, a storage battery of circular wall form comprising a case including a top cover and a tubular wall portion extending vertically throughout the center of said battery case and thereby defining a clear aperture therethroughout, a battery terminal conductor extending from one of the terminals of said battery into position adjacent the top end of the aperture through said battery case, and a battery mounting structure comprising a platform adapted to receive said battery in resting position thereon, said platform having extending therefrom a rod device adapted to slip-fit through said aperture when the battery is lowered into mounting position, said rod device provided at its outer end with means adapted to detachably connect the latter to said cover while bearing against said terminal conductor to hold said battery in firmly mounted position upon said platform, said detachable connection means and said rod device and said platform comprising electrically conductive material for providing grounded connection of said battery through said terminal conductor to structure electrically connected to said platform.

2. In combination, a storage battery comprising a unitary case, said case having an interior wall portion apertured vertically throughout the extent of said battery case, a battery terminal conductor extending from one of the terminals of said battery into position adjacent the top end of the aperture through said battery case, and a battery mounting structure comprising a battery installation platform adapted to receive said battery in resting position thereon, elongate projecting hold-down means extending from said platform adapted to slip-fit through said aperture when the battery is lowered into mounting position, and connection means provided at the outer end of said hold-down means adapted to extend over said terminal conductor and to detachably connect said hold-down means to the cover of said battery and to bear thereagainst with said terminal conductor therebetween to hold said battery in firmly mounted position upon said platform and to electrically contact said terminal conductor, said connection means and said hold-down means comprising electrically conductive material for providing grounded connection of said battery through said terminal to the structure electrically connected to said platform.

3. In combination in a vehicle, a storage battery comprising a casing having interior wall means therewithin defining a battery cell partitioning element, said wall means having an aperture extending vertically therethroughout from top to bottom of the casing, a terminal strap device extending in electrical connection from one terminal of said storage battery and having contact means at said aperture, and a battery mounting device comprising a battery installation platform fixed upon said vehicle and upon which said battery is adapted to rest, a hold-down tension device extending from said platform and adapted to slip-fit through said aperture and to extend beyond the cover structure of said battery when the latter is in mounted position, said tension device including means at the outer end thereof for detachably engaging the battery cover structure and adapted to press against said battery so as to hold it firmly against the platform with said tension device bearing in electrical connection against said contact means, said tension member and said platform being constructed of electrically conductive material and grounded to the vehicle frame, whereby said tension device simultaneously secures said battery to said platform and completes electrical ground from said terminal to said vehicle frame.

4. In combination, a storage battery comprising a case including a top cover and a tubular wall portion extending vertically throughout of said battery case interiorly thereof and thereby defining a clear aperture therethroughout, a battery terminal conductor extending from one of the terminals of said battery into position adjacent the top end of the aperture through said battery case, and a battery mounting structure comprising a platform adapted to receive said battery in resting position thereon, said platform having extending therefrom an elongate projecting hold-down device adapted to slip-fit through said aperture when the battery is lowered into mounting position, said hold-down device being provided at its outer end with means adapted to detachably connect the latter to said cover while bearing against said terminal conductor to hold said battery in firmly mounted position upon said platform, said detachable connection means and said hold-down device and said platform comprising electrically conductive material for providing grounded connection of said battery through said terminal conductor to structure electrically connected to said platform.

5. In combination a storage battery comprising a unitary case, said case including a tubular wall portion extending vertically completely through the case inwardly of the side walls thereof and defining a clear opening extending through the case from top to bottom thereof, and a battery mounting structure comprising a platform adapted to receive said battery with the bottom wall of the case resting thereon, said platform having extending upwardly therefrom an elongated substantially rigid member adapted to slip-fit through said opening when the battery is lowered into mounting position on the platform, and means on the outer end of said elongated member adapted for detachably engaging the top of the case to hold said battery in firmly mounted position upon said platform.

6. A storage battery and mounting structure therefor as set forth in claim 5 and in which the platform is constructed of sheet metal and the elongated fastening member is formed by a portion of the platform cut to provide a tongue bent at an angle to the general plane of said platform, said tongue having a portion thereof adjacent the region of its connection with said platform arranged to provide a spring action whereby said tongue may be pulled upon to be displaced against the spring forces thereof, said tongue device terminating in a hook portion so constructed and arranged as to overlie the top cover structure of the battery when mounted upon said platform.

7. A storage battery and mounting structure therefor as set forth in claim 5 and in which the platform comprises a sheet metal structure having a rim formation peripherally thereof and the elongated fastening member is formed by a portion of the platform cut to provide a tongue bent at an angle to the general plane of said platform, said tongue device terminating in a hook portion so constructed and arranged as to overlie the top cover structure of the battery when mounted upon said platform.

8. A storage battery and mounting structure therefor as set forth in claim 5 and in which the platform comprises a metal structure, and the elongated fastening member is formed by a metal tongue having an end thereof structurally and electrically connected to said platform, said tongue device terminating in a hook portion so constructed and arranged as to be hooked to overlie the top cover structure of the battery when mounted upon said platform.

JOHN L. RUPP.

References Cited in the file of this patent

UNITED STATES PATENTS

| Number | Name | Date |
|---|---|---|
| 1,298,857 | Angell | Apr. 1, 1919 |
| 1,382,980 | Hunt | June 28, 1921 |
| 1,506,837 | Johnson | Sept. 2, 1924 |
| 1,618,112 | Setzer | Feb. 15, 1927 |
| 1,952,150 | Trimble et al. | Mar. 27, 1934 |
| 1,982,801 | Gerking | Dec. 4, 1934 |
| 1,999,945 | Rathburn | Apr. 30, 1935 |
| 2,187,494 | Gray | Jan. 16, 1940 |
| 2,253,417 | Clark | Aug. 19, 1941 |
| 2,254,991 | Breeden | Sept. 2, 1941 |
| 2,481,558 | Appel | Sept. 13, 1949 |
| 2,548,256 | Deo | Apr. 10, 1951 |

FOREIGN PATENTS

| Number | Country | Date |
|---|---|---|
| 293,945 | Great Britain | July 19, 1928 |